United States Patent

[11] 3,612,657

| | | |
|---|---|---|
| [72] | Inventor | Samuel P. Sawyer<br>Evanston, Ill. |
| [21] | Appl. No. | 48,238 |
| [22] | Filed | June 22, 1970 |
| [45] | Patented | Oct. 12, 1971 |
| [73] | Assignee | Zenith Radio Corporation<br>Chicago, Ill. |

[54] LIGHT-INTENSITY CONTROL DEVICE UTILIZING ORIENTED PARTICLES SUSPENDED IN A GEL
6 Claims, 5 Drawing Figs.

[52] U.S. Cl. ............................................. 350/161, 350/267
[51] Int. Cl. .......................................... G02f 1/34, G02f 1/36
[50] Field of Search ............................................. 350/160, 161, 267

[56] References Cited
UNITED STATES PATENTS
3,257,903   6/1966   Marks .......................... 350/267

*Primary Examiner*—William L. Sikes
*Assistant Examiner*—Orville B. Chew, II
*Attorney*—John J. Pederson ABSTRACT: An adjustable light-intensity control device utilizes small, essentially flat particles oriented about parallel axes in the general direction of the light to be controlled and which are suspended in a clear loose gel in a suitable light-transmissive container. The light transmissivity of the device is changed by means of a "venetian blind" effect, with the container being provided with a partition which is moved in a direction transverse to the particle orientation so that the gel may be deformed to present an increasing fraction of the particle cross section to light rays which otherwise would pass through the device unobstructed. A servomechanism may be attached to the partition to make possible such applications as a window automatically adjustably to provide a constant ambient light level.

PATENTED OCT 12 1971 3,612,657
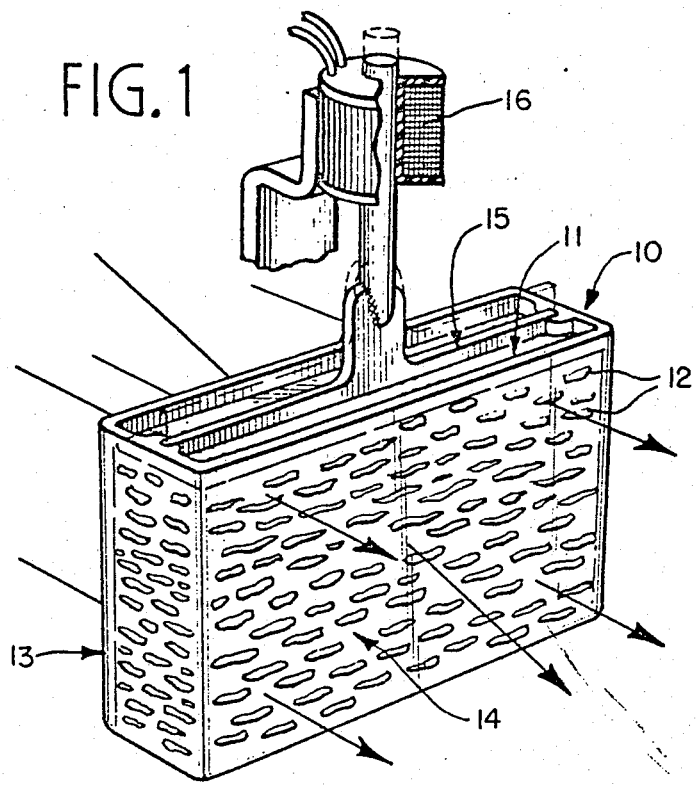
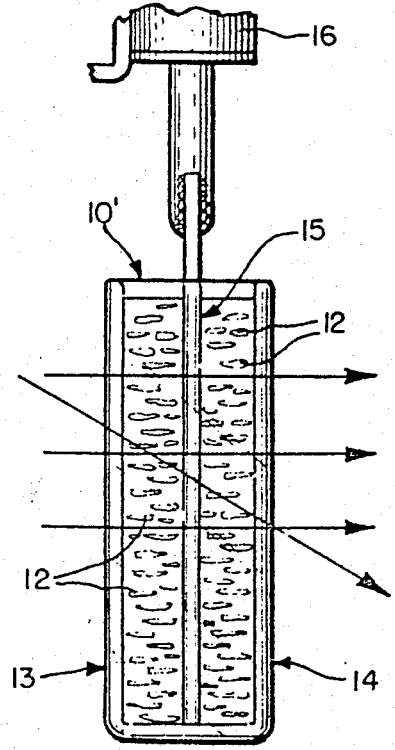
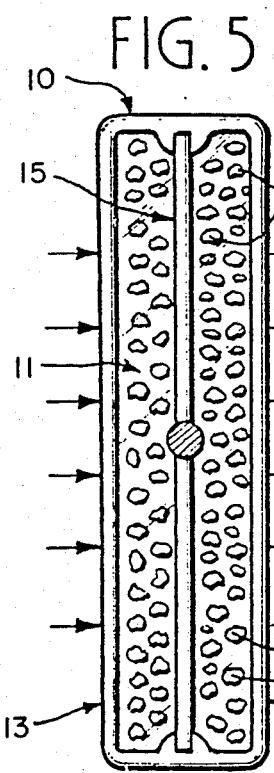
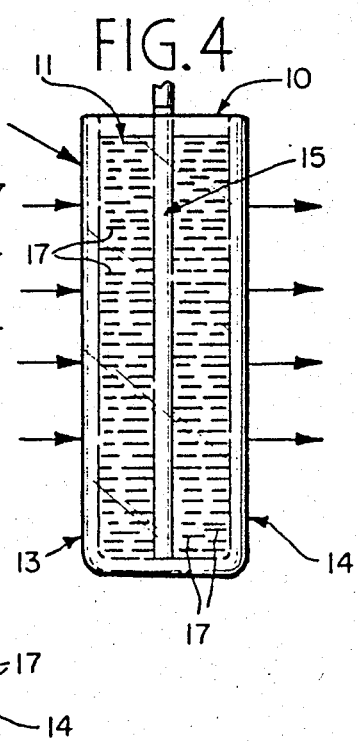
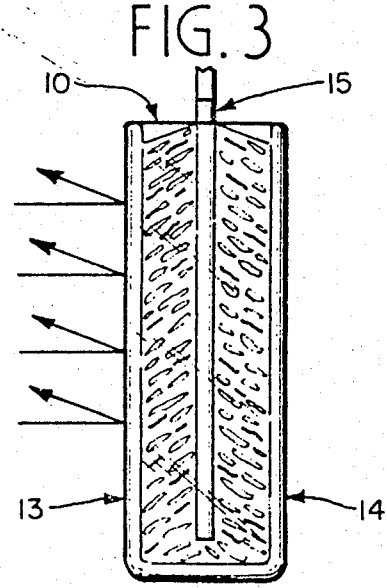
Inventor
Samuel P. Sawyer
By *John J. Pederson*
Attorney

LIGHT-INTENSITY CONTROL DEVICE UTILIZING ORIENTED PARTICLES SUSPENDED IN A GEL

BACKGROUND OF THE INVENTION

This invention relates to the adjustable control of light intensity and particularly to devices in which the light-controlling elements are minute particles embedded in a light-transmitting body and in which the orientation of such particles is changeable so as to effect variations in the light transmission.

In the operation of many types of optical systems, it is often necessary to provide a device for the adjustable control of light intensities. Many such devices of a mechanical nature, such as diaphragms, shutters, and "venetian blinds" types of regulators, suffer from disadvantages such as bulkiness, complexity, clumsy operation, relatively slow response time, lack of flexibility in dimensions, as well as the imposition of undesirable optical aberrations upon the light being controlled, such as causing spurious and nonuniform variations in intensity, or undesired defocusing or diffracting effects.

In the control of ambient light within a room with a window as a source of illumination, various expedients have been heretofore provided, commonly venetian blinds and various types of tinted and photochromic glass. These have obvious disadvantages, in particular in the matter of adjustability; either adjustment is crude and clumsy, or it is preset to a nonadjustable gradient.

SUMMARY OF THE INVENTION

It is therefore an object of the present invention to provide an improved but uncomplicated device for the control of light intensity.

It is a further object of the present invention to provide a light intensity control device having a fast response time, easy adjustment over a wide range, and a high light-transmission ratio, as well as being capable of easy automation.

It is yet a further object of the invention to provide a lighting system control and an intensity control for optical systems which will not degrade the optical quality of the light.

A device for adjustable controlling incident light in accordance with the invention includes a light-transmissive deformable body having at least one face receptive to incident light, and particles of generally planar configuration distributed throughout and fixedly suspended within the body and oriented so that each such planar configuration is oriented in a direction transverse to one of the light-receptive faces. The device further includes means for changing the inclination of the particles relative to the light-receptive face, including a partition positioned generally parallel to the one face within the body and movable relative to the one face in a direction generally parallel to that face so that the body is deformed and the inclination of the particles is changed thereby varying the transmission of the light through the body accordingly.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIG. 1 is a perspective view of an adjustable light-intensity control device constructed in accordance with the invention;

FIG. 2 is a side view of the device of FIG. 1 adjusted so that incident light is transmitted;

FIG. 3 is a side view of the device of FIG. 1 adjusted for minimum transmission, or maximum reflectivity;

FIG. 4 is a side view of a device constructed in a manner similar to that of FIG. 1, but with particles oriented parallel to each other for maximum discrimination against light incident at a vertical angle with maximum transmission of light travelling in a horizontal plane; and FIG. 5 is a top view of the device of FIG. 4, showing the flat parallel orientation of the particles to accomplish a discrimination in favor of horizontally oriented light.

DESCRIPTION OF THE PREFERRED EMBODIMENT

Referring to FIGS. 1 through 3, the light control device of the invention includes a clear light-transmissive box-like container 10, preferably of glass, housing a light-controlling body 11 of matter which is a mixture of a light transmissive clear gel and small flat particles or platelets of generally planar configuration, examples of which are shown at 12 in greatly exaggerated scale. The container also incorporates two rectangular flat parallel faces 13 and 14 through which the light to be controlled is received or transmitted, as is illustrated schematically by the light rays in FIGS. 1 and 2, as well as a center plate 15 coextensive with the faces, dividing in two parts the internal volume and consequently the gel-particle light-controlling body 11, and which may be raised and lowered with respect to the container.

The planar particles or platelets within the body 11 are preferably opaque and either reflective or black and light-absorptive, although particles which are not completely opaque or which are colored may also be used. The black particles are preferably of graphite and have a major dimension of approximately 50 to 100 microns. The reflective particles are preferably of the oxide of iron $\alpha$ $Fe_2O_3$, as set forth in the Journal of Applied Physics, Volume 29, No. 2, 223-224, Feb., 1958, have a major dimension of approximately 10 microns, and are plated with a very thin layer of nickel by means of any of the standard electroless chemical deposition methods well known in the art. Two such deposition methods are given on pages 516 and 518 of Metal Finishing Guide Book—Directory for 1970, 38th Edition, Metals and Plastics Publications, Inc., Westwood, N.J.

Each of the planar particles is aligned so as to be oriented in a direction transverse relative to, and preferably perpendicular to, the faces 13 and 14. A servomechanism 16 is connected to the center partition 15 so as to be able to move the partition up or down a small distance upon actuation by a signal. The gel tends to adhere to the inside of container 10 but distorts under the influence of a small movement of the partition 15 as is shown in FIG. 3. Such a distortable gel may be one of the "loose gels" known in the art, and may be formed, for example, in a few hours from a silicone fluid to which a catalyst is added to bring about partial polymerization. A fluid and catalyst for making such a gel is that described in U.S. Pat. No. 3,020,260 and sold under the name "Sylgard 51" by the Dow-Corning Corp. of Midland, Mich.

Within the distorted body, the particles, originally perpendicular to the faces 13 and 14, are inclined at an angle to the faces and thus present a greater fraction of their cross-sectional area to the incoming light, cutting the transmissivity of the device. Transmission can be effectively stopped by a combination of high particle density and a sufficient degree of distortion of body 11. It is found that such distortion may cause the particle inclination to the faces to reach an angle of as much as 45°. The degree of particle inclination or of particle density needed to achieve a given minimum transmission can be lessened by the use of particles with a greater degree of acicularity. If the particles used are black, incident light is increasingly absorbed as transmission is decreased, while if reflective particles are used, the device will reflect incident light increasingly as transmission is decreased, as is shown in FIG. 3. With a high particle density such that maximum light transmission is approximately 50 percent, the transmission ratio, i.e., the ratio of the maximum light transmission to the minimum light transmission, is found to be very favorable, commonly $10^5$ and better, because the particles have been oriented as described above, optimizing transmission when the body 11 is in its nondistorted condition.

The orientation of the particles suspended in the gel-particle body 11 is preferably accomplished during the time of such gel formation from the liquid state by the concurrent application of an electric field in the desired direction of orientation. Placing the assembly between two uniform parallel metal plates large enough to cover both faces 13 and 14, and connecting the plates to a voltage source would be a typical means of achieving such an orienting electric field.

The device of the invention may also be constructed with the flat particles having an additional orientation, so that they are not only perpendicular to the faces 13 and 14, but also are parallel to each other as well. Preferably the parallel particles, examples of which are illustrated at 17 in FIGS. 4 and 5, have their planes oriented horizontally. Thus, squarely observing the faces of the device, and, as is illustrated schematically in FIG. 4, the sides of the device will reveal only the particle edges when the partition is adjusted for maximum light transmission. All other elements in FIGS. 4 and 5 are the same as those of FIGS. 1 through 3, including the container 10, gel-particle body 11, faces 13 and 14, partition 15, and servomechanism 16. FIG. 5 schematically illustrates such a doubly oriented system as viewed from a point above the device; from this vantage point, the full cross section of the particles 17 is presented.

The double orientation of the particles 17 may be accomplished during the time of formation of the gel from the liquid state by a liquid shear method which is well known in the art, whereby a difference in magnitude but not direction of the velocity over various planes within the liquid mixture is established, orienting the particles 17 in parallel planes in accordance with the liquid flow. A description of this method for orienting the particles 17 may be found in "The Properties of Nacreous Pigments," L. M. Greenstein and H. A. Miller, Technical Papers, Volume XIII, Annual Technical Conference, Society of Plastic Engineer, Inc., Detroit, Mich. 1967, p. 1121.

In operation, the device is placed with face 13 or 14 intercepting the light to be controlled, and the light is efficiently transmitted through the device as indicated in FIGS. 1, 2, 4 and 5 as long as the body 11 remains undistorted, since the particle alignment is such as to present very little interference to the passage of light. If the particles are additionally oriented parallel to each other as in FIGS. 4 and 5, minimal interference is presented to light travelling in a horizontal plane parallel to those of the particles. However, incident light travelling in a plane transverse to those of the particles is discriminated against, as is illustrated in FIG. 4. In use as an adjustable-transmission window and the like, this feature becomes very effective in eliminating glare, as well as in widening the angle of view in the horizontal plane; thus, the double oriented embodiments of FIGS. 4 and 5 may be quite desirable in use. If the particles are also reflective, they will have the additional feature of reflecting away undesirably oriented radiation; in strong sunlight, this will have the desirable effect of cutting the amount of heat added to the window and illuminated area.

The servomechanism 16 is actuated to raise the partition 15 a small distance, of the order of one-half millimeter at the maximum, in the case of a small device having a thickness of the order of 1 millimeter, as is shown in FIG. 3. Of course, the partition 15 may also be raised by hand or by other means. This movement causes the body 11 to be distorted by shear so that the particles 12 or 17 assume an inclination of as much as 45 degrees. At the extreme inclination the body presents effectively its smallest degree of transmission to incident light. With a sufficiently high particle density, all light transmission effectively ceases at such a minimum transmission setting of the partition 15, and if reflective particles are used, the reflectivity to incident radiation also is greatest at this setting. It also should be noted that the particle inclination and consequently distortion of body 11 required to achieve a given decrease in transmission may be decreased by increasing the particle density.

Intermediate settings of the device, to transmit more light than at the setting for minimum transmission but less than at the maximum transmission setting, are easily obtainable by simply raising the partition 15 through smaller distances, so that a lesser degree of shear distortion is imposed upon body 11 and a lesser inclination of the particles 12 or 17 is obtained. All such settings are easily obtained with very favorable response times from any other previous setting because of the very small movement of the partition which is required. As was previously mentioned, a typical thin device will require only a ½-millimeter movement of partition 15 to go from a fully transmissive setting to its minimally transmissive setting. Such small movements are readily executed nearly instantaneously by means of many servomechanisms or transducers well known in the art.

Operation of the partition 15 may be readily accomplished in an automatic fashion, with the servomechanism 16 controlled by a photocell, thereby varying the attenuation of the device in accordance with the ambient light level, or the servomechanism 16 itself may be a very simple but automatic device such as a heat-responsive bimetallic element for sunlight or infrared light application.

Thus the invention is readily adaptable to numerous control alternatives, including hand operation, operation upon signal, or automatic, as well as numerous applications, such as an illumination-controlled window, a fast light beam shutter control, and an instantaneously adjustable light intensity control for optical systems and other applications. In all such applications the device will have very advantageous optical and mechanical characteristics. Yet in all such applications it will be of simple design, readily fabricated, and easily adaptable to many dimensional and configurational requirements.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A device for adjustably controlling incident light, comprising:
    a light-transmissive deformable body having at least one face receptive to incident light;
    particles of generally planar configuration distributed throughout and fixedly suspended within said body and oriented so that each such planar configuration is oriented in a direction transverse to one of said light-receptive faces;
    and means for changing the inclination of said particles relative to said one light-receptive face, including a partition positioned generally parallel to said one face within said body and movable relative to said one face in a direction generally parallel to said one face so that said body is deformed and the inclination of the particles is changed thereby varying the transmission of light through said body accordingly.

2. A device as in claim 1, wherein said means for changing the inclination of said particles includes electrically operated means for moving said partition.

3. A device as in claim 1 in which said particles are opaque, with said particles being distributed densely and said partition being movable to effectively stop the transmission of light through said body.

4. A device as in claim 1 in which said particles are reflective and upon movement of said partition incident light is reflected.

5. A device as in claim 1 in which said body is transparent and in which said particles are also oriented parallel to each other to provide full transmissivity to incident light travelling in planes parallel to those of said particles while decreasing transmissivity to incident light travelling in planes transverse to those of said particles.

6. A device as in claim 1 in which:
    said one light-receptive face is essentially planar, and said body further includes a second planar light-receptive face generally parallel to said one face, with said partition also being essentially planar and positioned within said body between said first and second light-receptive faces, and said particles are oriented in a direction perpendicular to one of said light-receptive faces.